(12) United States Patent
Saito et al.

(10) Patent No.: US 9,856,943 B2
(45) Date of Patent: Jan. 2, 2018

(54) REDUCTION MOTOR (71) Applicant: Mitsuba Corporation, Gunma (JP)

(72) Inventors: Tatsuyuki Saito, Kiryu-shi (JP);
Tetsuya Watanabe, Kiryu-shi (JP);
Naofumi Matoba, Kiryu-shi (JP);
Hitoshi Tsukamoto, Kiryu-shi (JP)

(73) Assignee: Mitsuba Corporation, Gunma (JP)

( * ) Notice: Subject to any disclaimer, the term of this patent is extended or adjusted under 35 U.S.C. 154(b) by 255 days.

(21) Appl. No.: 14/422,682

(22) PCT Filed: Sep. 20, 2013

(86) PCT No.: PCT/JP2013/076447
§ 371 (c)(1),
(2) Date: Feb. 19, 2015

(87) PCT Pub. No.: WO2014/051132
PCT Pub. Date: Apr. 3, 2014

(65) Prior Publication Data
US 2015/0219187 A1    Aug. 6, 2015

(30) Foreign Application Priority Data

Sep. 25, 2012 (JP) .................................. 2012-210338
Mar. 27, 2013 (JP) .................................. 2013-066944

(51) Int. Cl.
*F16H 1/32* (2006.01)
*H02K 7/116* (2006.01)
*H02K 7/08* (2006.01)

(52) U.S. Cl.
CPC ............... *F16H 1/32* (2013.01); *H02K 7/085* (2013.01); *H02K 7/116* (2013.01); *F16H 2001/324* (2013.01); *F16H 2001/327* (2013.01)

(58) Field of Classification Search
CPC ............................ F16H 1/32; F16H 2035/001
(Continued)

(56) References Cited

U.S. PATENT DOCUMENTS 3,413,896 A * 12/1968 Wildhaber ................ F16H 1/32
475/163
5,468,193 A * 11/1995 Yamaguchi ............. F16H 55/06
419/37
(Continued)

FOREIGN PATENT DOCUMENTS

JP    42012453 Y    7/1967
JP    49076164 U    7/1974
(Continued)

OTHER PUBLICATIONS

Japanese Patent Office, International Search Report issued in corresponding International Patent Application No. PCT/JP2013/076447 dated Jan. 7, 2014.

Primary Examiner — Stacey Fluhart
(74) Attorney, Agent, or Firm — Wood Herron & Evans LLP (57) ABSTRACT

A speed reducer (20) of a reduction motor (1) includes a first internal gear (22) attached to the housing, an input shaft (21) having an eccentric shaft portion (21*d*), a first external gear (24) having a pitch circle diameter smaller than a pitch circle diameter of the first internal gear (22), and an output member (27) connected to the first external gear (24). The input shaft (21) is configured to be rotated by a rotation input from the electric motor (10). The first external gear (24) is configured to be placed inside of the first internal gear (22) under a state that a part of an external teeth (24*a*) of the first external gear (24) engages with an internal teeth (22*d*) of the first internal gear (24*a*). A holding member (28) fixes the first internal gear (22) in the axial direction of the input shaft (21).

6 Claims, 8 Drawing Sheets (58) Field of Classification Search
USPC .......................................................... 475/163
See application file for complete search history.

(56) References Cited

U.S. PATENT DOCUMENTS

| | | | | |
|---|---|---|---|---|
| 2004/0248688 A1* | 12/2004 | Shimada | .............. | C10M 169/02 |
| | | | | 475/159 |
| 2005/0119085 A1* | 6/2005 | Becker | ................... | B60N 2/225 |
| | | | | 475/162 |
| 2006/0240932 A1* | 10/2006 | Hazama | .................... | F16H 1/32 |
| | | | | 475/169 |
| 2010/0234254 A1* | 9/2010 | Koshima | .............. | C10M 129/20 |
| | | | | 508/100 |
| 2012/0235462 A1* | 9/2012 | Yamamoto | ........... | B60K 7/0007 |
| | | | | 301/6.5 |

FOREIGN PATENT DOCUMENTS

| | | |
|---|---|---|
| JP | 63-259248 A | 10/1988 |
| JP | 07-151213 A | 6/1995 |
| JP | 2004301136 A | 10/2004 |
| JP | 2005098495 A | 4/2005 |
| JP | 2006234005 A | 9/2006 |
| JP | 2006300272 A | 11/2006 |
| JP | 2006300273 A | 11/2006 |
| JP | 2006304558 A | 11/2006 |

* cited by examiner

SECTION A-A

REDUCTION MOTOR

TECHNICAL FIELD

The present invention relates to a reduction motor, particularly, a reduction motor including a reducer having a hypocycloidal deceleration mechanism.

This application claims priority to and the benefit of Japanese Application No. 2012-210338 filed on Sep. 25, 2012, and Japanese Application No. 2013-066944 filed on Mar. 27, 2013, the disclosure of which is incorporated by reference herein.

BACKGROUND ART

A reduction motor including a reducer having a hypocycloidal deceleration mechanism is widely applied to industrial machinery of various types (e.g. Patent Document 1 to 4).

The hypocycloidal deceleration mechanism can achieve a high reduction ratio in a compact structure. A reduction motor including a reducer having a hypocycloidal deceleration mechanism can be made small. Therefore, the reduction motor including the reducer having the hypocycloidal deceleration mechanism can be easily installed in a small limited space for industrial machinery.

CITATION LIST

Patent Document

[Patent Document 1] Japanese Unexamined Patent Application, First Publication No. 2006-300272.
[Patent Document 2] Japanese Unexamined Patent Application, First Publication No. 2006-300273.
[Patent Document 3] Japanese Unexamined Patent Application, First Publication No. 2006-304558.
[Patent Document 4] Japanese Unexamined Patent Application, First Publication No. 2006-234005.

DISCLOSURE OF THE INVENTION

Problems to be Solved by the Invention

A reducer having a hypocycloidal deceleration mechanism includes an internal gear, an external gear, and an output member as fundamental composition and the reducer is housed inside a housing. The internal gear has a ring shape and attached to the housing. The external gear has a pitch circle diameter smaller than a pitch circle diameter of the internal gear. Further, the external gear is configured to be placed inside of the internal gear under a state that a part of an external tooth of the external gear engages with an internal tooth of the internal gear. The output member is connected to the external gear and outputs rotation movement of the external gear outside.

The external gear engaging with the internal gear performs orbital movement (oscillating movement) at a certain number of rotations (orbital velocity) by the rotation input from an electric motor. Further, the external gear performs rotational movement at a certain number of rotations (rotating velocity) by the engagement with the internal gear under the orbital movement. Further, the rotational movement of the external gear, which is reduced to the orbital movement, is transferred to the output member, then the rotation output outputs from the output member.

As described above, the reducer having a hypocycloidal deceleration mechanism has a structure in which the engagement reaction force of the external gear and the internal gear attached to the housing produces the rotation output. Therefore, the internal gear must be secured firmly to the housing.

In order to secure the internal gear firmly against the housing, it is considered to be inserted the internal gear into the housing and fixed the internal gear to the housing by "stationary fit". In the "stationary fit", for example, the outer diameter of the internal gear is set slightly larger than the inner diameter of the insertion portion of the housing. In case of the "stationary fit", compression stress radially act on the internal gear from the outside thereon. Strain may occur in the internal tooth of the internal gear by the compression stress. Then, the reduction efficiency of the reducer is lowered by the strain on the tooth surface.

Present invention provides a reduction motor having a hypocycloidal deceleration mechanism, without occurring strain in the internal tooth of the internal gear, in which the internal gear of the reduction motor can be secured firmly to the housing.

Means for Solving the Problems

According to a first aspect of the invention, a reduction motor includes: a housing; an electric motor housed inside the housing; and a speed reducer having a hypocycloidal deceleration mechanism, the speed reducer being housed inside the housing and connected to the electric motor.

Further, the speed reducer includes: a first internal gear having a ring shape, the first internal gear being inserted into and attached to the housing; an input shaft having a rod shape and having an eccentric shaft portion, the input shaft configured to be rotated by a rotation input from the electric motor; a first external gear having a pitch circle diameter smaller than a pitch circle diameter of the first internal gear, rotatably mounted on the eccentric shaft portion via a bearing, the first external gear configured to be placed inside of the first internal gear under a state that a part of an external teeth of the first external gear engages with an internal teeth of the first internal gear; and an output member connected to the first external gear and configured to be rotated by a rotation output reduced compared with the rotation input of the input shaft, and wherein a holding member fixes the first internal gear in the axial direction of the input shaft.

As described above, in the first aspect of the invention, the internal gear having a ring shape and attached to the housing is inserted and located into the housing. By the "inserting structure" of compression stress hardly acts radially on the internal gear from the outside thereon. Then, possibility that the strain occurs in the tooth surface of the internal tooth formed in the internal gear can be reduced.

Further, in order to firmly fix the internal gear to the housing, the internal gear is fixed to the housing by the holding member in the axial direction on the input shaft. Because of the "fixing structure" of the internal gear and the housing as described above, compression stress hardly acts radially on the internal gear from the outside thereon and the internal gear is firmly fixed to the housing.

MODES FOR CARRYING OUT THE INVENTION

First Embodiment

Hereinafter, a first embodiment of the present invention will be described referring to FIG. 1 to FIG. 4.

Figure 1:
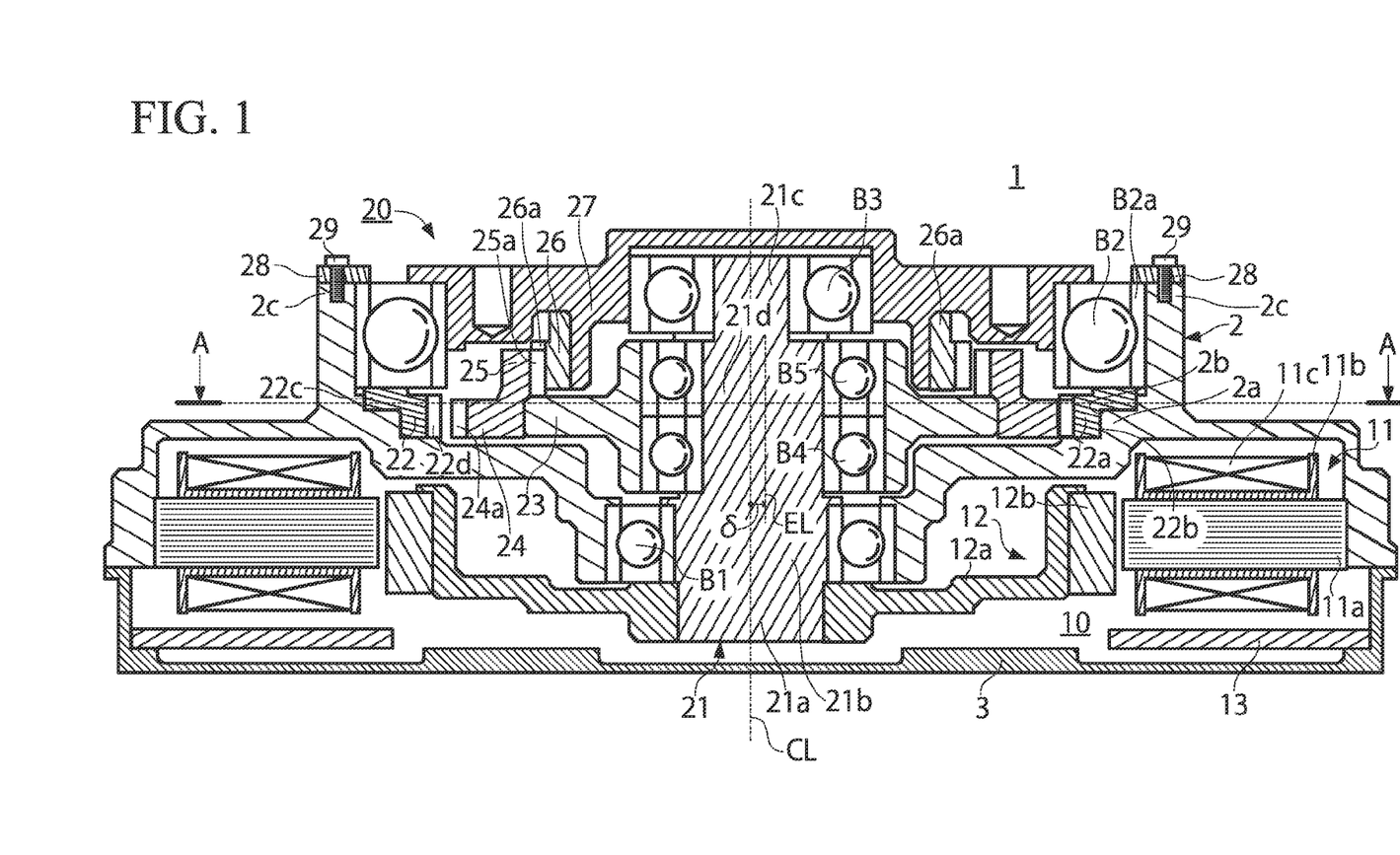
FIG. 1 is a vertical cross-section view of a reduction motor according to a first embodiment of the present invention.
Figure 2:
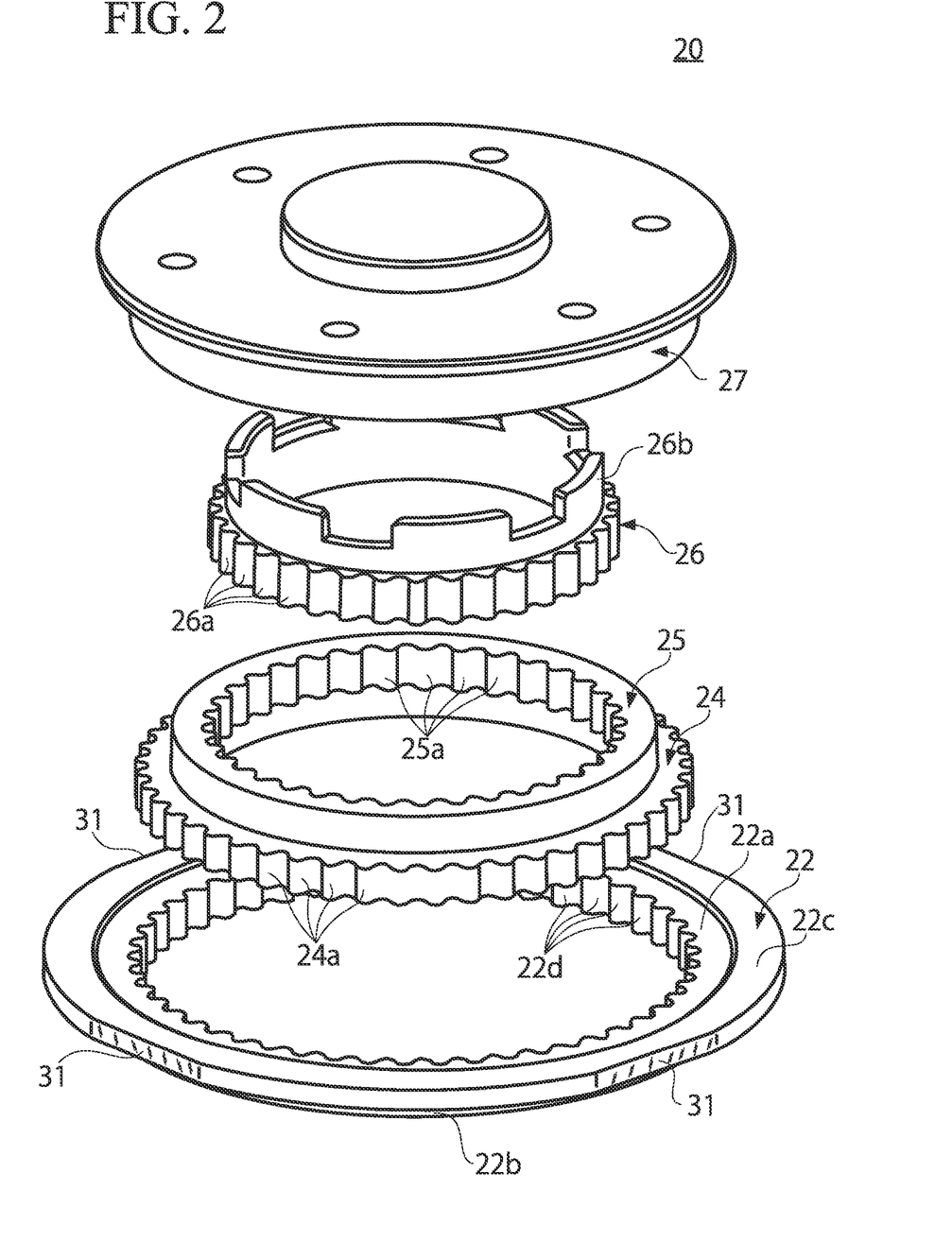
FIG. 2 is an exploded perspective view of a speed reducer according to the first embodiment of the present invention.
Figure 3:
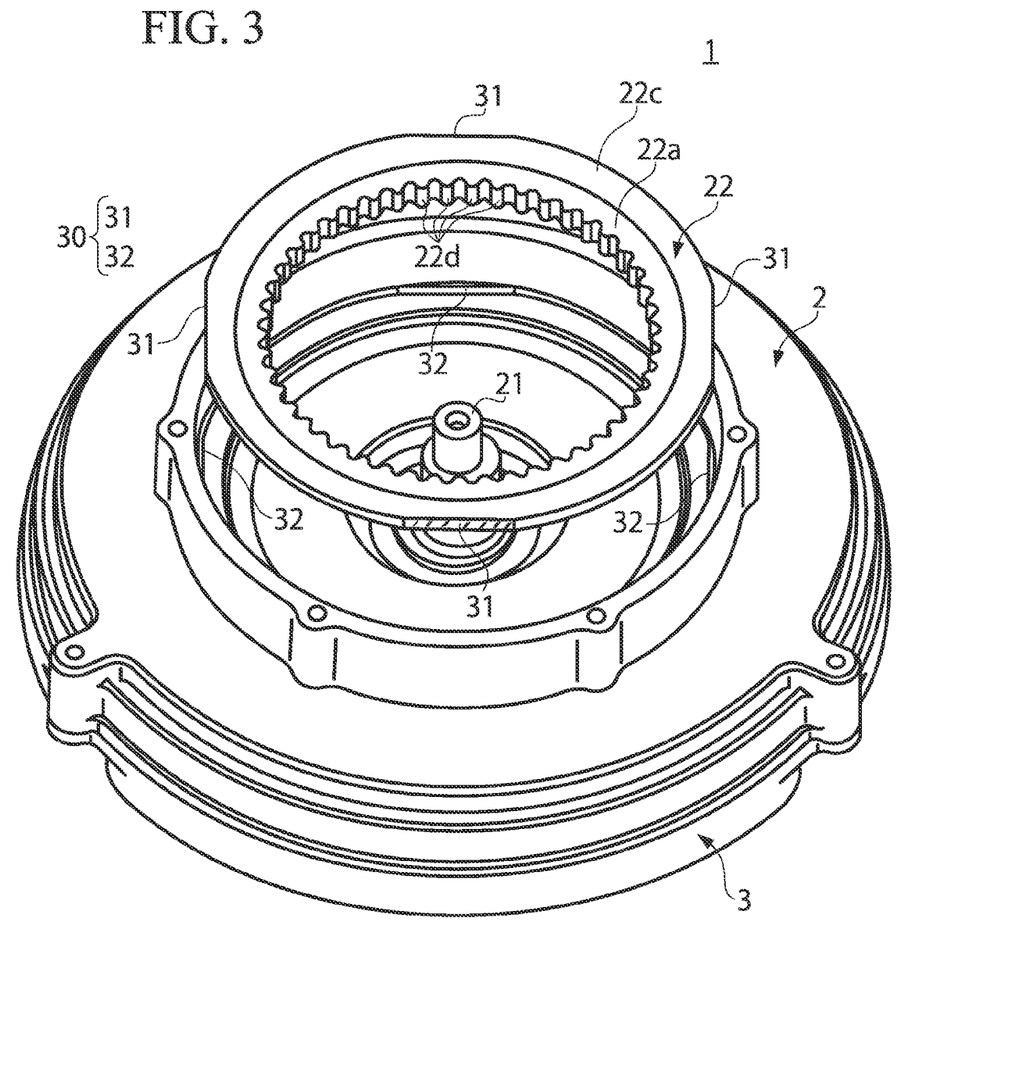
FIG. 3 is a perspective view showing the assembly structure of a first internal gear to a housing according to the first embodiment of the present invention.
Figure 4:
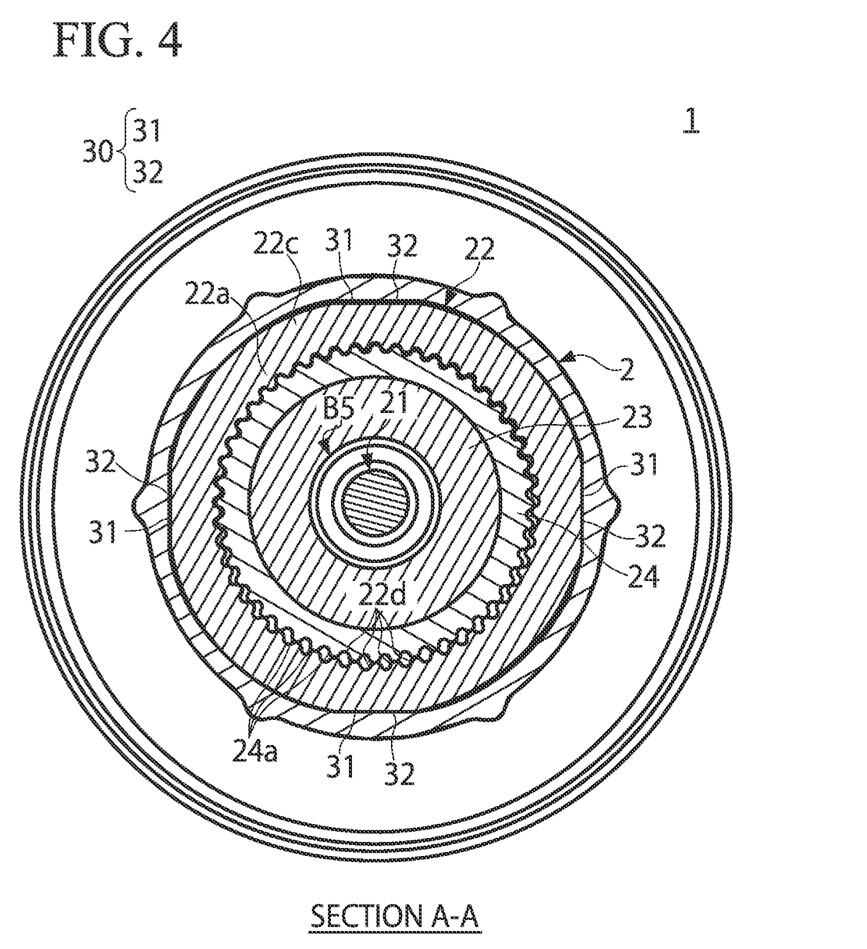
FIG. 4 is a cross-section view taken along line A-A of FIG. 1.

FIG. 1 is a vertical cross-section view of a reduction motor according to the first embodiment of the present invention. FIG. 2 is an exploded perspective view of a speed reducer according to the first embodiment of the present invention. FIG. 3 is a perspective view showing the assembly structure of a first internal gear to a housing according to the first embodiment of the present invention. FIG. 4 is a cross-section view taken along line A-A of FIG. 1.

As shown in FIG. 1, the reduction motor 1 includes a first housing 2, a second housing 3, an electric motor 10, and a speed reducer 20.

The electric motor 10 includes a stator 11, a rotor 12, and a power distribution board 13. The stator 11 has in a ring shape and is attached to the first housing 2. The rotor 12 is rotatably disposed in the inside of the stator 11. The power distribution board 13 supplies the controlled current to the stator 11.

The stator 11 includes a stator core 11a and coils 11c. The stator core 11a is formed by laminating thin steel plates. Each of the coils 11c is wound around the stator core 11a from the top of insulators 11b. The rotor 12 has a rotor body 12a and magnets 12b. The rotor body 12a has a bowl shape. The magnets 12b are attached to the outer peripheral surface of the rotor body 12a.

Next, based on FIG. 1 and FIG. 2, the speed reducer 20 provided for the reduction motor 1 is described. The speed reducer 20 has a hypocycloidal mechanism. The speed reducer 20 is housed inside the first housing 2 and is connected to the electric motor 10. Then, the speed reducer 20 reduces a rotation input from the electric motor 10 and outputs an output rotation.

The speed reducer 20 includes an input shaft 21, a first internal gear 22, a rotational member 23, a first external gear 24, a second internal gear 25, a second external gear 26, and an output member 27. The input shaft 21 has a rod shape and the tip portion 21a of the shaft 21 is attached to the rotor 12. Then, the shaft 21 is rotated by the rotation input from the electric motor 10. The first internal gear 22 has a ring shape and is attached to the first housing 2. The rotational member 23 has a substantially disc-shape. The first external gear 24 has a ring shape and is integrally attached to the outer periphery of the rotational member 23. The second internal gear 25 has a ring shape and is attached to the inner periphery of the first external gear 24. The second external gear 26 is disposed inside the second internal gear 25. The output member 27 has a substantially disc-shape and is attached to the second external gear 26. With the configuration described above, the output member 27 is connected to the first external gear 24 via the second external gear 26 and the second internal gear 25.

Then, based on FIG. 1, the mounting structure of the input shaft 21, the output member 27, and the rotational member 23 to the first housing 2 is described.

A bearing B1 and a bearing B2 are mounted to the first housing 2. The bearing B2 is inserted and disposed inside the first housing 2. Then, the bearing B2 is sandwiched by the first housing 2 and a bearing plate 28 as a holding member in an axial direction. As a fastening method of the bearing plate 28 to the housing 2, a screwing a screw 29 as a fastener member may be adopted.

The output member 27 is supported by the bearing B2 rotatably with respect to the housing 2. One end portion 21b of the input shaft 21 is supported by the bearing B1, the other end portion 21c is supported by the bearing B3 arranged into the output member 27. In the manner described above, the input shaft 21 and the output member 27 are rotatably mounted to the first housing 2 respectively.

The input shaft 21 has an eccentric shaft portion 21d. The eccentric shaft portion 21d is disposed at a position eccentric to the axis center (rotation axis) CL of the input shaft 21. More specifically, the axial center EL of the eccentric shaft portion 21d is disposed at a position length away δ toward the radially outward parallel to the rotation axis CL. Then, the rotational member 23 is rotatably mounted on the eccentric shaft portion 21d via the bearing B4 and the bearing B5. Herein, the bearing B4 and the bearing B5 are disposed adjacent in series in the axial direction.

Next, based on FIG. 1 and FIG. 2, the first external gear 24, the second internal gear 25, and the second external gear 26 are explained.

As shown in FIG. 1 and FIG. 2, the first external gear 24 has a ring shape and has a pitch circle diameter smaller than a pitch circle diameter of the first internal gear 22. Here, as described above, the first external gear 24 has a ring shape and is integrally attached to the outer periphery of the rotational member 23. Further, the rotational member 23 is rotatably mounted on the eccentric shaft portion 21d via the bearing B4 and the bearing B5. The external gear 24 is rotatably mounted on the eccentric shaft portion 21d via the bearing B4 and the bearing B5 by being attached to the rotational member 23.

Further, the first external gear 24 is configured to be placed inside of the first internal gear 22 under a state that a part of external teeth 24a of the first external gear 24 engages with internal teeth 22d of the first internal gear 22. By the rotation input from the electric motor 10, the external gear 24 performs orbital movement (oscillating movement) at the same number of rotations (orbital velocity) as the number of rotations of the motor 10. Then, by the engagement with the first internal gear 22 of the first external gear 24, the first external gear 24 performs rotational movement at a certain number of rotations which is decelerated to a predetermined ratio to the number of the rotations of the orbital movement.

The second internal gear 25 has a ring shape and is integrally provided to the first external gear 24 concentrically. By being integrally provided to the first external gear 24, the second internal gear 25 performs orbital movement (oscillating movement) at the same number of rotations as the number of the rotations of the first external gear's orbital movement. Further, the second internal gear 25 performs rotational movement at the same number of rotations as the number of the rotations of the first external gear's rotational movement.

The second external gear 26 has a ring shape and has a pitch circle diameter smaller than a pitch circle diameter of the second internal gear 25. The second external gear 26 is configured to being placed inside of the second internal gear 25 under a state that a part of external teeth 26a of the second external gear 26 engages with internal teeth 25a of the second internal gear 25. The second external gear 26 is coaxially disposed with the rotation axis CL of the input shaft 26 and is attached to the output member 27 via a fitting portion 26b. The second external gear 26 is rotated with a rotation output at a certain number of the rotations by the orbital movement and rotational movement of the second internal gear 25. By the rotation output, the output member 27 integrally attached to the second external gear 26 rotates. In this case, the output member 27 rotates by the rotation output with a number of rotation decelerated by the orbital movement and rotational movement of the second internal gear 25 to a predetermined ratio.

In the following, a reduction ratio (=R) of the speed reducer 20 is explained. Where, the number of teeth of the first internal gear 22 is denoted by "z1", the number of teeth of the first external gear 24 is denoted by "z2", the number of teeth of the second internal gear 25 is denoted by "z3", and the number of teeth of the second external gear 26 is denoted by "z4".

When the input shaft 21 is rotated at an certain angle θin by the actuation of the motor 10, by the engagement of the first internal gear 22 and the first external gear 24, the first external gear 24 performs rotational movement at an certain angle θ1 shown in the following:

$$\theta1=\theta in\times(z1-z2)/z2=\theta in\times Z1;$$

where, $Z1=(z1-z2)/z2$.

Further, by the orbital movement (oscillating movement) of the eccentric shaft portion at the certain angle θ1, the first external gear 24 performs orbital movement at a certain angle θ2 shown in the following:

$$\theta2=\theta in+\theta1.$$

As described above, the second internal gear 25 is integrally attached to the first external gear 24. Then, the second internal gear 25 performs the rotational movement (θ1) and orbital movement (θ2) the same movement as the first external gear 24.

Then, by the engagement of the second internal gear 25 and the second external gear 26 under the rotational movement and the orbital movement of the second internal gear 25, the second external gear 26 performs rotational movement at an certain angle θout shown in the following:

$$\theta out=\theta1+\theta2\times(z3-z4)/z4=\theta1+\theta2\times Z2;$$

where, $Z2=(z3-z4)/z4$.

As described above, the speed reducer 20 performs the speed transmission of two steps, one step is between the first internal gear 22 and the first external gear 24, the other step is between the second internal gear 25 and the second external gear 26. Then, the reduction ratio (=R) is shown in the following:

$$R=1/(\theta out/\theta in)=1/(Z1+(1+Z1))\times Z2.$$

In the speed reducer 20, the rotation input from the motor 10 is decelerated at the reduction ratio (=R), the output member 27 rotates at the rotation output decelerated by the speed reducer 20.

In this embodiment, the number of teeth of the first internal gear 22 is "49 (=z1)", the number of teeth of the first external gear 24 is "48 (=z2)", the number of teeth of the second internal gear 25 is "36 (=z3)", and the number of teeth of the second external gear 26 is "35(=z4)". Then, the reduction ratio is "20(=R)".

Next, based on FIG. 1, FIG. 3 and FIG. 4, the mounting structure of the first internal gear 22 to the first housing 2 is explained.

As shown in FIG. 3, the first internal gear 22 is mounted on the first housing 2 from outside thereof. As shown in FIG. 2 and FIG. 3, the first internal gear 22 has a body portion 22a having a ring shape and a fixed portion 22c having a ring portion. A plurality of internal tooth 22d are formed on the inner wall of the body portion 22a, and the fixed portion 22c is formed integrally on the outer edge of the body portion 22a toward radially outside direction.

As shown FIG. 1, outer diameter of the outer circumference 22b of the body portion 22a is set to have a tolerance so that the outer diameter is to be "the same with" or "slightly smaller than" the inner diameter of the inner circumference 2b of insertion portion 2a provided in the first housing 2. Then, the body portion 22a of the first internal gear 22 is inserted in the "clearance fit" or "Middle-fit" in the first housing 2 and disposed into the first housing 2. Pitch circle of the internal teeth 22d formed in the body portion 22a and the circle forming the inner circumference 2b are set so as to be concentric each other. Then, center of the pitch circle of the first internal gear 22 is set to be coaxial with the rotation axis CL of the input shaft 21.

The fixed portion 22c is formed in a flange shape formed radially outward from the body portion 22. As shown in FIG. 1, the fixed portion 22c is inserted into the first housing 2 together with the body portion 22a and disposed inside the first housing 2. Then, by the bearing B2 which is inserted from the open side of the first housing 2, the fixed portion 22c is fixed to the first housing 2. In this case, the lower surface of the fixed portion 22c of the first internal gear 22 is held by the insertion portion 2a of the first housing 2, and the upper surface of the fixed portion 22c of the first internal gear 22 is held by the outer race B2a of the bearing B2.

The bearing plate (holding member) 28 is disposed on the opening side of the outer race B2a of the bearing B2. Then, the bearing plate 28 is fastened to an end portion 2c of the first housing 2 by screws (fastener member) 29. By the screws 29 is fastened to the first housing 2, the fixed portion 22c is sandwiched by the screws 29 and the first housing 2 in the axial direction via the bearing plate 28 and the outer race B2a and fixed on the first housing 2.

Next, based on FIG. 3 and FIG. 4, a rotation prevention mechanism 30 is explained, that is provided on an interface between the first internal gear 22 and the first housing 2.

Four chamfered portions 31 having a straight shape are formed on the outer circumference of the fixed portion 22c in each of four equally position. Each of four projection portions 32 are respectively formed in the first housing 2 at each position corresponding to each of the chamfered portions 31. The projection portions 32 protrude radially inward. Then, each of the chamfered portions 31 of the first internal gear 22 is respectively disposed in abutment with each of the projecting portions 32 of the first housing 2. The rotation prevention mechanism 30 is configured such that the chamfered portions 31 of the first internal gear is disposed to be abutted the projecting portions 32 of the first housing 2.

Second Embodiment

Hereinafter, a second embodiment of the present invention will be described on FIG. 5 to FIG. 9.

Figure 5:
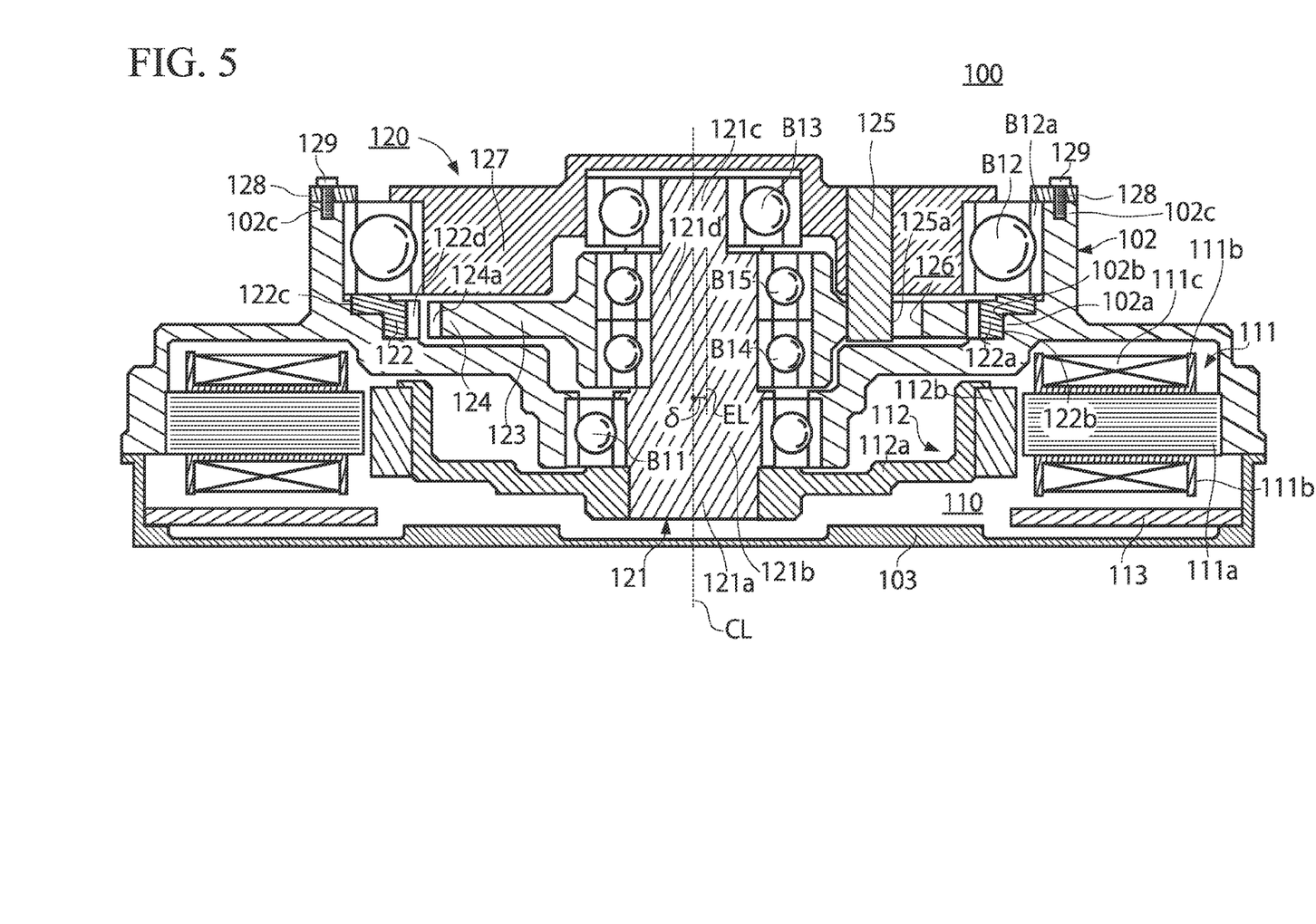
FIG. 5 is a vertical cross-section view of a reduction motor according to a second embodiment of the present invention.
Figure 6:
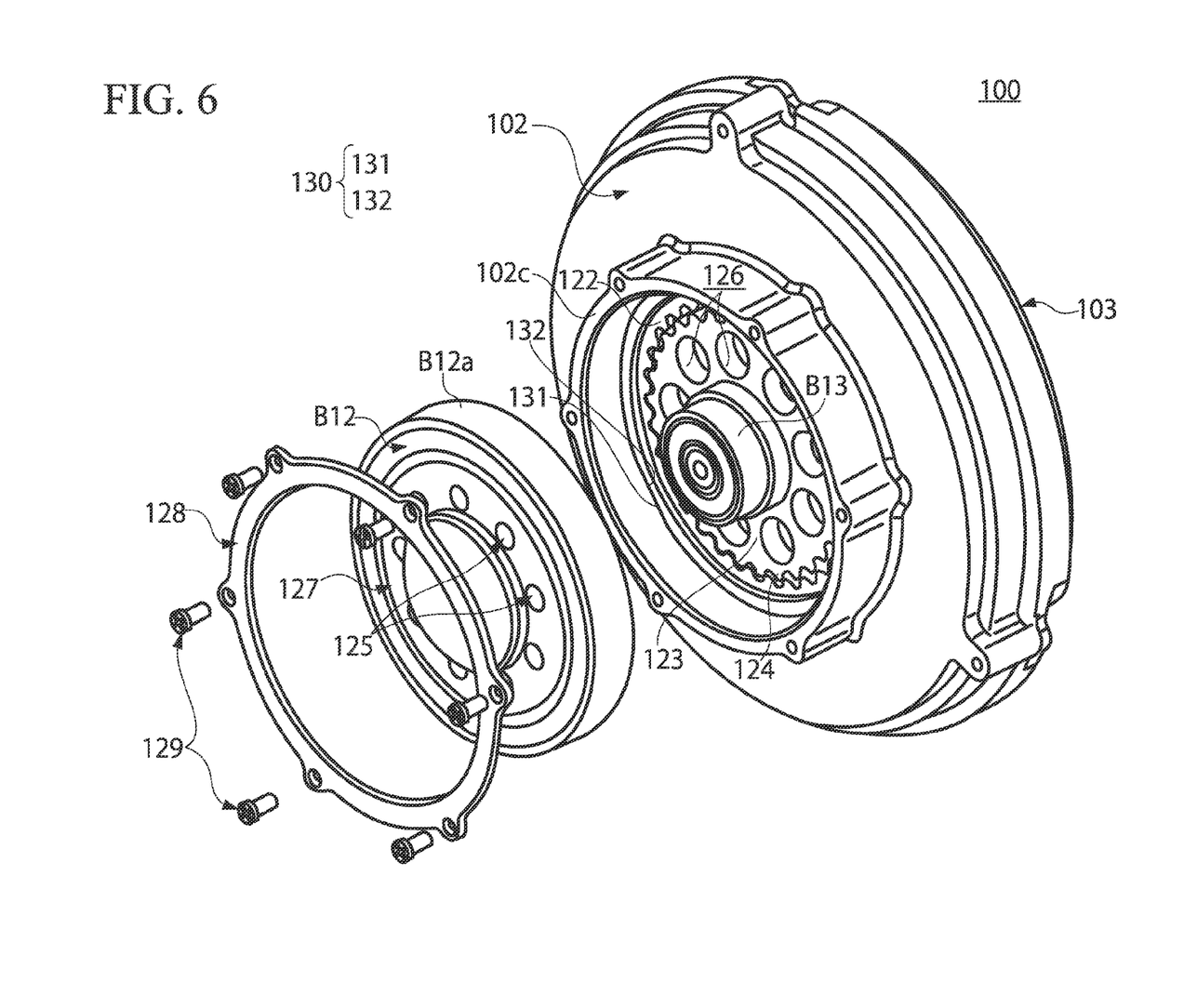
FIG. 6 is an exploded perspective view of a reduction motor according to the second embodiment of the present invention.
Figure 7:
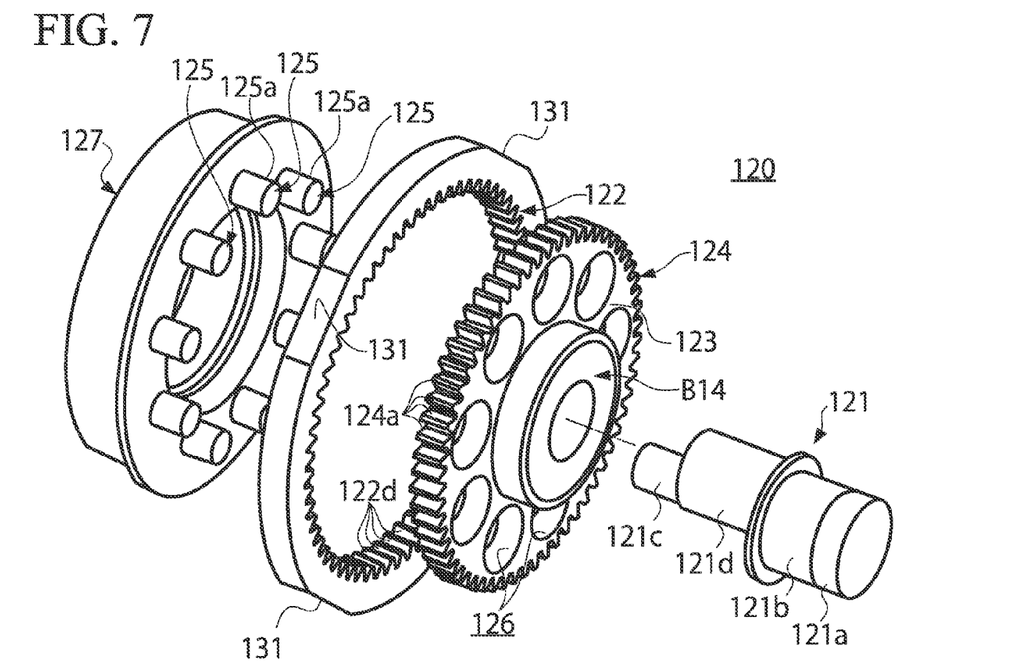
FIG. 7 is an exploded perspective view of a speed reducer according to the second embodiment of the present invention.
Figure 8:
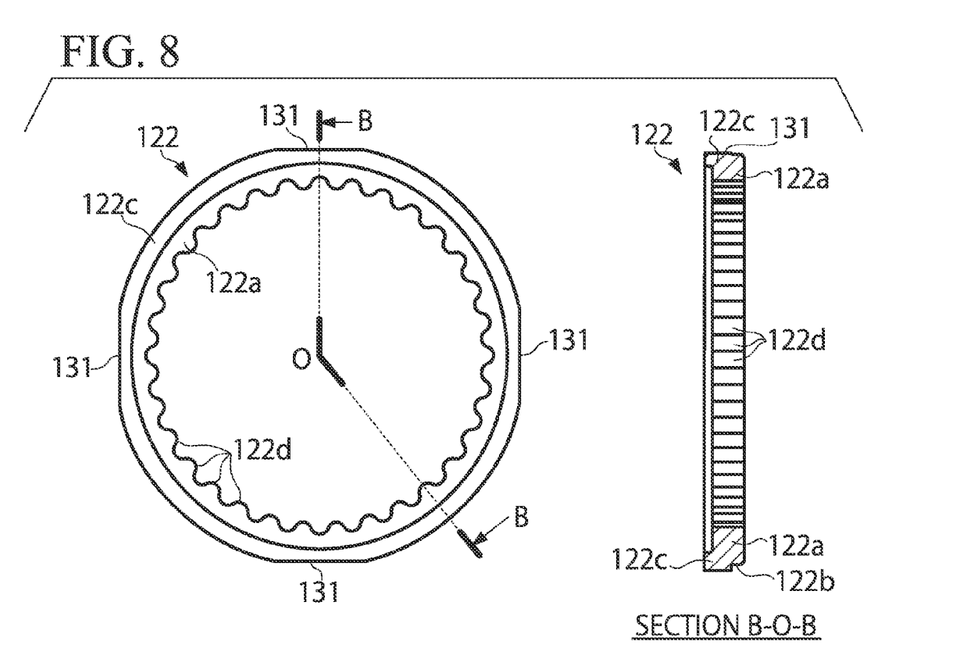
FIG. 8 is a front view and a cross-section view of a first internal gear according to the second embodiment of the present invention.
Figure 9:
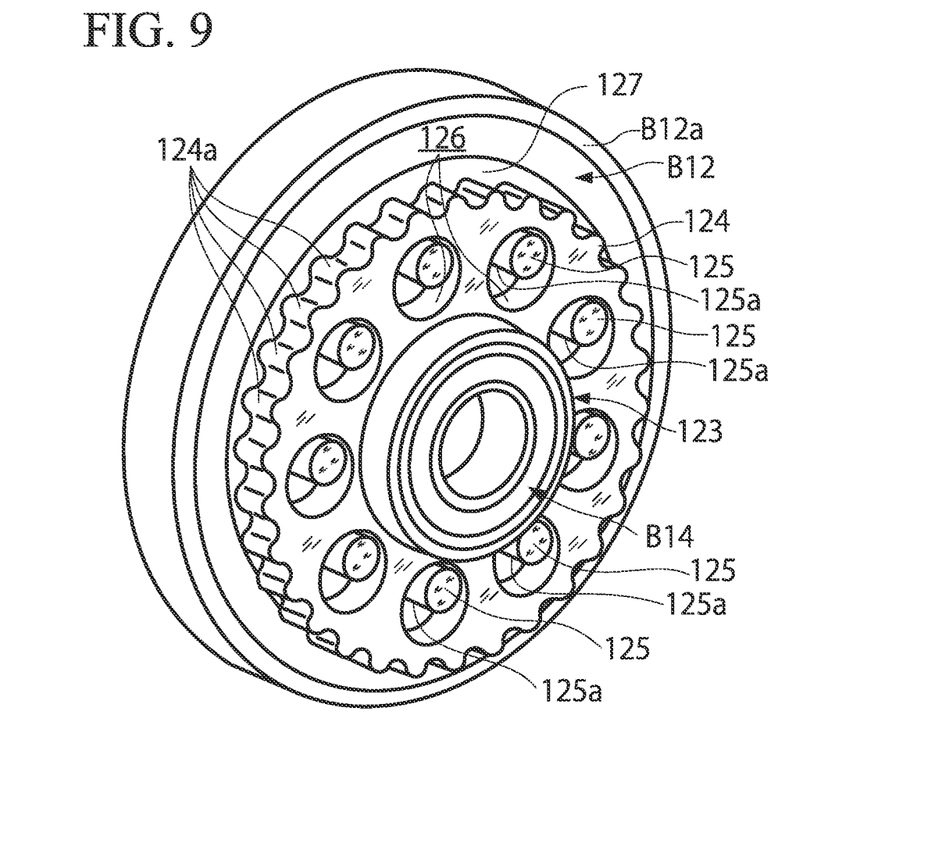
FIG. 9 is a perspective view showing the arrangement of the output pins and the oscillation holes according to the second embodiment of the present invention.

FIG. 5 is a vertical cross-section view of a reduction motor according to the second embodiment of the present invention. FIG. 6 is an exploded perspective view of the reduction motor according to the second embodiment of the present invention. FIG. 7 is an exploded perspective view of a speed reducer according to the second embodiment of the present invention. FIG. 8 is a front view and a cross-section view of a first internal gear according to the second embodiment of the present invention. FIG. 9 is a perspective view showing the arrangement of the output pins and the oscillation holes according to the second embodiment of the present invention.

As shown in FIG. 5, the reduction motor 100 includes a first housing 102, a second housing 103, an electric motor 110, and a speed reducer 120.

The electric motor 110 includes a stator 111, a rotor 112, and a power distribution board 113. The stator 111 has in a ring shape and is attached to the first housing 102. The rotor 112 is rotatably disposed in the inside of the stator 111. The power distribution board 113 supplies the controlled current to the stator 111.

The stator 111 includes a stator core 111a and coils 111c. The stator core 111a is formed by laminating thin steel plates. Each of the coils 111c is wound around the stator core 111a from the top of insulators 111b. The rotor 112 has a rotor body 112a and magnets 112b. The rotor body 112a has a bowl shape. The magnets 112b are attached to the outer peripheral surface of the rotor body 112a.

Next, based on FIG. 6 and FIG. 7 in addition to FIG. 5, the speed reducer 120 provided in the reduction motor 100 is described. The speed reducer 120 has a hypocycloidal mechanism. The speed reducer 120 is housed inside the first housing 102 and is connected to the electric motor 110. The speed reducer 120 reduces a rotation input from the electric motor 110 and outputs an output rotation.

The speed reducer 120 includes an input shaft 121, a first internal gear 122, a rotation member 123, a first external gear 124, a plurality of output pin 125, and a output member 127. The input shaft 121 has a rod shape and the tip portion 121a of the shaft 121 is attached to the rotor 112. Then, the shaft 121 is rotated by the rotation input from the electric motor 110. The first internal gear 122 has a ring shape and is attached to the first housing 102. The rotation member 123 has a substantially disc-shape. The first external gear 124 has a ring shape and is integrally attached to the outer periphery of the rotation member 123. The output member 127 has a substantially disc-shape.

The output pins 125 are concentrically attached to the output member 127. The rotation member 123 is provided with a plurality of oscillation hole 126 concentrically arranged in the circumferential direction at a position corresponding to the output pins 125. Then, each of the output pins 125 is configured to be inserted into each of the oscillation holes 126 respectively. The plurality of output pin 125 has a sliding contact surface 125a configured to slidingly contact with the plurality of oscillation hole 126, and the sliding contact surface 125a is applied with DLC (diamond-like carbon) treatment. The surface treatment is not limited to the DLC treatment, but may be a surface treatment of HV3000 Vickers hardness or higher.

With the configuration described above, the output member 127 is connected to the first external gear 124 via the output pins 125 and the rotation member 123.

Then, based on FIG. 5 and FIG. 6, the mounting structure of the input shaft 121 and the output member 127 to the first housing 102, further, the rotation member 123 and the first internal gear 122 to the first housing 102 will be described.

A bearing B11 and a bearing B12 are mounted on the first housing 102. The bearing B12 is inserted and disposed inside the first housing 102. Then, the bearing B12 is axially sandwiched to the first housing 102 by a bearing plate 128 as a holding member. The fixing by sandwiching described above is configured of a sandwiching configuration of an outer race B12a of the bearing B12 between the first housing 102 and the bearing plate 128. As a fastening method of the bearing plate 128 to the housing 102, a screwing of a screw 129 as a fastener member may be adopted.

The output member 127 is rotatably supported by the bearing B12 with respect to the housing 102. One end portion 121b of the input shaft 121 is supported by the bearing B11, the other end portion 121c is supported by the bearing B13 arranged into the output member 127. In the manner described above, the input shaft 121 and the output member 127 are rotatably mounted on the first housing 102 respectively.

The input shaft 121 has an eccentric shaft portion 121d. The eccentric shaft portion 121d is disposed at an eccentric position to the axis center (rotation axis) CL of the input shaft 121. More specifically, the axial center EL of the eccentric shaft portion 121d is disposed at a position length away δ toward the radially outward parallel to the rotation axis CL. Then, the rotation member 123 is rotatably mounted on the eccentric shaft portion 121d via the bearing B14 and the bearing B15. Herein, the bearing B14 and the bearing B15 are disposed adjacent in series in the axial direction.

Next, based on FIG. 5 and FIG. 7, the first external gear 24 is explained.

As shown in FIG. 5 and FIG. 7, the first external gear 124 has a ring shape and has a pitch circle diameter smaller than a pitch circle diameter of the first internal gear 122. Here, as described above, the first external gear 124 has a ring shape and is integrally attached to the outer periphery of the rotation member 123. Further, the rotation member 123 is rotatably mounted on the eccentric shaft portion 121d via the bearing B14 and the bearing B15. That is to say, by being formed integrally with the rotation member 123, the external gear 124 is rotatably mounted on the eccentric shaft portion 121d via the bearing B14 and the bearing B15.

The first external gear 124 is disposed inside of the first internal gear 122 under a state that a part of external teeth 124a of the first external gear 124 engages with internal teeth 122d of the first internal gear 122. By the rotation input from the electric motor 110, the external gear 124 performs orbital movement (oscillating movement) at the same number of rotations (orbital velocity) as the number of rotations of the motor 110. Then, by the engagement with the first internal gear 122 of the first external gear 124, the first external gear 124 performs rotational movement at a certain number of rotations which is decelerated to a predetermined ratio to the number of the rotations of the orbital movement. The rotational movement is transmitted to the output member 127 via the output pins 125. Then, by the rotational movement, the output member 127 rotates under the state of traveling together with the first external gear 124.

In the following, a reduction ratio (=R) of the speed reducer 120 is explained. Where, the number of teeth of the first internal gear 122 is denoted by "z1", and the number of teeth of the first external gear 124 is denoted by "z2".

When the input shaft 121 is rotated at an certain angle θin by the actuation of the motor 110, by the engagement of the first internal gear 122 and the first external gear 124, the first external gear 124 performs rotational movement at an certain angle θout shown in the following:

$$\theta out = \theta in \times (z1-z2)/z2 = \theta in \times Z;$$

where, $Z=(z1-z2)/z2$.

As described above, the speed reducer 120 performs the speed transmission between the first internal gear 122 and the first external gear 124. Then, the reduction ratio (=R) is shown in the following:

$$R=1/(\theta out/\theta in)=1/Z$$

In the speed reducer 120, the rotation input from the motor 110 is decelerated at the reduction ratio (=R), and the output member 127 rotates at the rotation output decelerated by the speed reducer 120.

Next, based on FIG. 5, FIG. 6 and FIG. 8, the mounting structure to the first housing 102 of the first internal gear 122 is explained.

As shown in FIG. 6, the first internal gear 122 is mounted on the first housing 102 from outside thereof. As shown in FIG. 8, the first internal gear 122 has a body portion 122a having a ring shape and a fixed portion 122c having a ring portion. A plurality of internal tooth 122d is formed on the inner wall of the body portion 122a, and the fixed portion 122c is formed integrally on the outer edge of the body portion 122a toward radially outside direction.

As shown FIG. 5, outer diameter of the outer circumference 122b of the body portion 122a is set to have a tolerance so that the outer diameter is to be "the same with" or "slightly smaller than" the inner diameter of the inner circumference 102b of insertion portion 102a provided in the first housing 102. Then, the body portion 122a of the first internal gear 122 is inserted in the "clearance fit" or "Middle-fit" in the first housing 102 and disposed into the first housing 102. Pitch circle of the internal teeth 122d formed in the body portion 122a and the circle forming the inner circumference 102b are set in a concentric each other. Then, center of the pitch circle of the first internal gear 122 is set to be coaxial with the rotation axis CL of the input shaft 121.

As shown FIG. 5, the fixed portion 122c is formed in a flange shape formed radially outward from the body portion 122. The fixed portion 122c is inserted into the first housing 102 together with the body portion 122a and disposed inside the first housing 102. Then, by the bearing B12 which is inserted from the open side of the first housing 102, the fixed portion 122c is fixed to the first housing 102. In this case, the lower surface of the fixed portion 122c of the first internal gear 122 is held by the insertion portion 102a of the first housing 102, and the upper surface of the fixed portion 122c of the first internal gear 122 is held by the outer race B12a of the bearing B12.

The bearing plate (holding member) 128 is disposed on the opening side of the outer race B12a of the bearing B12. Then, the bearing plate 128 is fastened to an end portion 102c of the first housing 102 by screws (fastener member) 129. By the screws 129 being fastened to the first housing 102, the fixed portion 122c is sandwiched by the screws 129 and the first housing 102 in the axial direction via the bearing plate 129 and the outer race B12a and fixed on the first housing 102.

Next, based on FIG. 6 and FIG. 8, a rotation prevention mechanism 130 is explained, that is provided on an interface between the first internal gear 122 and the first housing 102.

Four chamfered portions 131 having a straight shape are formed on the outer circumference of the fixed portion 122c in each of four equally position. Each of four projection portions 132 are respectively formed in the first housing 102 at each position corresponding to each of the chamfered portions 131. The projection portions 132 protrude radially inward. Then, each of the chamfered portions 131 of the first internal gear 122 is respectively disposed in abutment with each of the projecting portions 132 of the first housing 102. By the chamfered portions 131 and the projecting portions 132, the rotation prevention mechanism 130 is constructed.

In addition, the present invention is not limited to the embodiments but may be variously design-changed without depart from the scope of the present invention.

INDUSTRIAL APPLICABILITY

According to the present invention, since the first internal gear of the reduction motor can be secured firmly to the housing, without occurring strain in the internal tooth of the internal gear, the reduction efficiency of the speed reducer is not lowered by the strain on the tooth surface. Then, the reduction motor can operate at high efficiency.

DESCRIPTION OF REFERENCE NUMERALS 1 reduction motor
2 first housing
2a insertion portion
2b inner circumference
2c end portion
3 second housing
10 electric motor
11 stator
11a stator core
11b insulator
11c coil
12 rotor
12a rotor body
12b magnet
13 power distribution board
20 speed reducer
21 input shaft
21a tip portion
21b end portion
21c end portion
21d eccentric shaft portion
22 first internal gear
22d internal tooth (teeth)
22a body portion
22b outer circumference
22c fixed portion
23 rotational member
24 first external gear
24a external tooth
25 second internal gear
25a internal tooth
26 second external gear
26a external tooth
26b fitting portion
27 output member 28 holding member (bearing plate)
29 fastener member (screw)
30 rotation prevention mechanism
31 chamfered portion
32 projecting portion
CL rotation axis
EL eccentric axis
δ length eccentricity
R reduction ratio
B1 bearing
B2 bearing
B2a outer race
B3 bearing
B4 bearing
B5 bearing
B6 bearing
100 reduction motor
102 first housing
102a insertion portion
102b inner circumference
102c end portion
103 second housing
110 electric motor
111 stator
111a stator core
111b insulator
111c coil
112 rotor
112a rotor body
112b magnet
113 power distribution board
120 speed reducer
121 input shaft
121a tip portion
121b end portion
121c end portion
121d eccentric shaft portion
122 first internal gear
122d internal tooth
122a body portion
122b outer circumference
122c fixed portion
123 rotation member
124 first external gear
124a external tooth
125 output pin
125a slidingly contact surface
126 oscillation hole
127 output member
128 holding member (bearing plate)
130 rotation prevention mechanism
131 chamfered portion
132 projecting portion

The invention claimed is:

1. A reduction motor comprising:
a housing having a holding portion;
an electric motor housed inside the housing; and
a speed reducer as a hypocycloidal mechanism, the speed reducer being housed inside the housing and connected to the electric motor,
wherein the speed reducer comprises:
a first internal gear having a ring shape, the first internal gear being attached to the holding portion of the housing such that at least a part of the first internal gear is inserted into the inside of the holding portion;
an input shaft having a rod shape and having an eccentric shaft portion, the input shaft configured to be rotated by a rotation input from the electric motor;
a first external gear having a pitch circle diameter smaller than a pitch circle diameter of the first internal gear, rotatably mounted on the eccentric shaft portion via a bearing, the first external gear configured to be placed inside of the first internal gear under a state that a part of an external teeth of the first external gear engages with an internal teeth of the first internal gear;
an output member connected to the first external gear and configured to be rotated by a rotation output reduced compared with the rotation input of the input shaft;
a holding member fastening the output member to the housing by screwing a screw; and
an outer race for a bearing, the outer race being disposed between the first internal gear and the holding member,
wherein the outer diameter of the first internal gear is set to have a tolerance so as to be the same with or slightly smaller than the inner diameter of the holding portion of the first housing, and
wherein, by screwing the screw, the holding member fixes the first internal gear on the housing in the axial direction of the input shaft via the outer race.

2. The reduction motor according to claim 1,
wherein the speed reducer further comprises:
a second internal gear having a ring shape and integrally provided with the first external gear; and
a second external gear having a pitch circle diameter smaller than a pitch circle diameter of the second internal gear, the second external gear configured to be placed inside of the second internal gear under a state that a part of an external teeth of the second external gear engages with an internal teeth of the second internal gear, and
wherein the second external gear is attached to the output member, and the output member is connected to the first external gear via the second internal and the second external gear.

3. The reduction motor according to claim 1,
wherein the speed reducer has a rotation member having a disc shape and to which the first external gear is attached, the rotation member is provided with a plurality of oscillation holes concentrically arranged in the circumferential direction,
the output member is attached with a plurality of output pins, a number of the output pins is the same as a number of the oscillation holes, and the output pins are configured to be inserted into the oscillation holes, and
the output member is connected to the first external gear by the output pins.

4. The reduction motor according to claim 3,
wherein the plurality of output pins has a sliding contact surface configured to slidingly contact with the plurality of oscillation holes, and the sliding contact surface is applied with a surface treatment of HV3000 Vickers hardness or higher.

5. The reduction motor according to claim 4, wherein the surface treatment is DLC treatment.

6. The reduction motor according to claim 1, further comprising a rotation prevention mechanism provided on an interface between the first internal gear and the housing, the rotation prevention mechanism having a chamfered portion and associated projecting portion.

* * * * *